(12) United States Patent
Meguro et al.

(10) Patent No.: US 6,327,136 B1
(45) Date of Patent: Dec. 4, 2001

(54) ELECTRODE-FORMING COMPOSITION, ACTIVATED CARBON ELECTRODE AND ELECTRIC DOUBLE LAYER CAPACITOR

(75) Inventors: Kazuhiro Meguro, Chiba-ken; Hiroshi Sato, Fukushima-ken; Yasuhiro Tada, Ibaraki-ken, all of (JP)

(73) Assignee: Kureha Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/497,732

(22) Filed: Feb. 4, 2000

(30) Foreign Application Priority Data

Feb. 5, 1999 (JP) .................................. 11-028439

(51) Int. Cl.[7] ............... H01G 9/00; C01B 31/00; C01B 31/02
(52) U.S. Cl. .................. 361/502; 361/503; 423/445 R
(58) Field of Search ................... 361/502, 503, 361/504, 505; 423/445 R; 29/25.03; 429/27, 29, 40–46, 192, 246–247

(56) References Cited

U.S. PATENT DOCUMENTS

| 5,682,288 | * | 10/1997 | Wani | ..................................... 361/502 |
| 5,776,637 | * | 7/1998 | Kashio et al. | ........................ 429/217 |
| 5,838,531 | * | 11/1998 | Saito et al. | ............................ 361/502 |
| 6,031,712 | * | 2/2000 | Kurihara et al. | ...................... 361/502 |
| 6,064,561 | * | 5/2000 | Harada et al. | ........................ 361/502 |

\* cited by examiner

*Primary Examiner*—Dean A. Reichard
*Assistant Examiner*—Eric Thomas
(74) *Attorney, Agent, or Firm*—Wenderoth Lind & Ponack, L.L.P.

(57) ABSTRACT

An electrode-forming composition for providing an activated carbon electrode for an electric double layer capacitor is provide by blending activated carbon, a vinylidene fluoride polymer and a solvent including a plasticizer in addition to a good solvent for the vinylidene fluoride polymer. By applying the electrode-forming composition onto an electroconductive substrate, and selectively removing the solvent preferably by a combination of extraction of the plasticizer with a poor solvent for the vinylidene-fluoride polymer and evaporation of the solvent, it is possible to obtain an activated carbon electrode (polarizable electrode) that has an activated carbon electrode layer exhibiting good adhesion onto the electroconductive substrate and a good flexibility, and therefore has good processability. By using the activated carbon electrodes as polarizable electrodes, it is possible to provide an electric double layer capacitor having improved reliability.

9 Claims, 1 Drawing Sheet

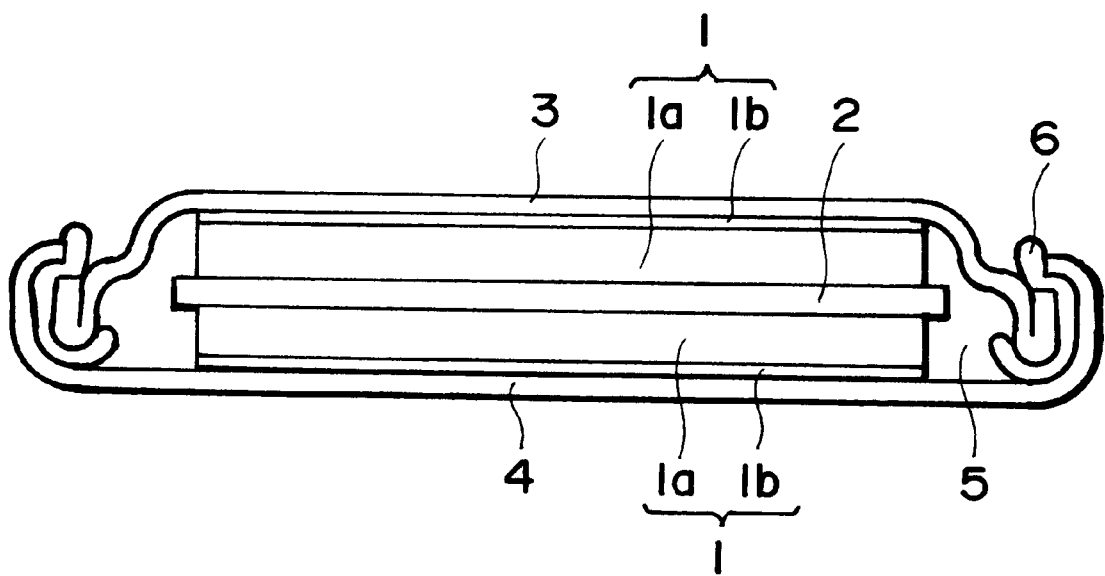

ELECTRODE-FORMING COMPOSITION, ACTIVATED CARBON ELECTRODE AND ELECTRIC DOUBLE LAYER CAPACITOR

FIELD OF THE INVENTION AND RELATED ART

The present invention relates to an electrode-forming composition for providing an activated carbon electrode with excellent processability or handling characteristic, an activated carbon electrode obtained from the electrode-forming composition, and an electric double layer capacitor equipped with the activated carbon electrode so as to exhibit an improved reliability.

Accompanying the development of electronic and electric devices and apparatus in recent years, there is a strong demand for various types of power supplies or electricity sources in addition to well-developed commercially power supply requiring large-scale cable or wiring. In this respect, an electric double layer capacitor is calling a particular expectation as a new type of energy device for functional applications in many fields in view of advantageous characteristics, such as a large capacity, a long life, quick chargeability, easiness of charging and discharging and better cycle characteristic than secondary batteries. Further, the application of electric double layer capacitor is extended from small-capacity use, such as back-up power supply for electronic devices, up to large-capacity use such as auxiliary energy sources for electromotive vehicles and hybrid cars under consideration. Accompanying therewith, higher performances, such as a higher capacity, are required of polarizable electrodes constituting electric double layer capacitors.

An electric double layer capacitor is a capacitor device utilizing a capacitance of charge stored in an electric double layer capacitor formed at a boundary between a polarizable electrode and an electrolyte. The electric double layer capacitors are roughly divided in terms of electrolytic solutions used therein, i.e., organic solvent-type and aqueous solution-type. An organic solvent-type electric double layer capacitor has a high withstand voltage and can have an increased capacitance, so that it is advantageous as a large-capacity capacitor. The polarizable electrode is required to have large specific surface area and bulk density, be electrochemically inert and have a low resistivity. A polarizable electrode structure for an electric double layer capacitor generally comprises a powdery activated carbon material, an electroconductivity imparting material, a binder material and an electroconductive metal substrate. As processes for producing such electrode structures, there are known a process wherein a solvent is added to a mixture of a powdery activated carbon material, an electroconductivity-imparting material and a binder to form a mixture slurry, which is then applied on an electroconductive substrate by coating or dipping, followed by drying, to form an electrode structure (e.g., as disclosed in Japanese Laid-Open Patent Application (JP-A) 10-64765), and a process wherein a solvent is added to a mixture of a powdery activated carbon material, an electroconductivity-imparting material and a binder insoluble in the solvent, the resultant mixture is kneaded and formed into a sheet, and the sheet, after being dried, is bonded onto an electroconductive substrate via an electroconductive substrate, followed by pressing and heat-treatment for drying, to form an electrode structure (e.g., as disclosed in JP-A 9-275041). The former process is preferable in view of the production cost.

As the binder, polyvinylidene fluoride has been noted for its electrochemical stability, etc. For example, JP-A 8-55761 has disclosed a process for producing an electric double layer capacitor including a step of forming a polarizable electrode wherein a slurry comprising a fluorine-containing polymer, such as polyvinylidene fluoride, an organic solvent, such as N-methyl-2-pyrrolidone, toluene, ethyl acetate or dimethyl phthalate, activated carbon powder, and an optionally added electroconductivity-imparting agent, is applied onto an electroconductive substrate and dried for removal of the organic solvent to form a polarizable electrode. A similar technique is also disclosed in JP-A 8-213289.

However, the polarizable electrode (activated carbon electrode) obtained through the above-mentioned processes has involved a defect that the activated carbon electrode layer formed by the coating is liable to be peeled from the electroconductive substrate and has an insufficient flexibility, so that the resultant entire activated carbon electrode suffers from poor processability and insufficient reliability. In order to solve the above-mentioned defect, JP-A 10-64517 discloses to use a vinylidene fluoride-based rubber. However, such a vinylidene fluoride-based rubber is liable to be swollen with an organic solvent-type electrolytic solution, thus being liable to cause a separation of the electrode layer during use of the capacitor and resulting in an electric double layer capacitor having a low reliability.

SUMMARY OF THE INVENTION

In view of he above-mentioned circumstances of the prior art, a principal object of the present invention is to provide an electrode-forming composition capable of providing an activated carbon electrode layer well adhered to an electroconductive substrate and having an improved flexibility.

Another object of the present invention is to provide an activated carbon electrode having such an activated carbon electrode layer and showing excellent processability.

A further object of the present invention is to provide an electric double layer capacitor including such an activated carbon electrode and exhibiting an improved reliability.

As a result of our study for accomplishing the above-mentioned objects, it has been found very effective to incorporate a plasticizer for a vinylidene fluoride polymer in addition to a good solvent for a vinylidene fluoride polymer ordinarily used within an electrode-forming composition to be applied onto an electroconductive substrate to form an activated carbon electrode layer.

Thus, according to the present invention, there is provided an electrode-forming composition, comprising: activated carbon, a vinylidene fluoride polymer having an inherent viscosity of 0.5–20.0 dl/g, and a solvent, wherein the solvent comprises a mixture of a good solvent and a plasticizer for the vinylidene fluoride polymer.

The present invention further provides an activated carbon electrode (polarizable electrode) formed by applying the above-mentioned electrode-forming composition onto an electroconductive substrate to form a composite layer and selectively removing the solvent from the composite layer to form an activated carbon electrode layer. Preferably, the activated carbon electrode layer is formed by optionally removing at least a portion the solvent by evaporation from the composite layer, then extracting the plasticizer by contacting the composite layer with a poor solvent for a vinylidene fluoride polymer and then evaporating the poor solvent from the composite layer. If the plasticizer is removed by extraction with a poor solvent in this manner, it is assumed that the vinylidene fluoride polymer as the binder in the resultant activated carbon electrode layer is made porous, and this contributes to a remarkably improved flexibility and an improved adhesion with the electroconductive substrate of the activated carbon electrode layer.

The present invention further provides an electric double layer capacitor comprising a pair of polarizable electrodes, and an electrolytic solution disposed between the polarizable electrodes, wherein at least one of the polarizable electrodes comprises an activated carbon electrode structure as mentioned above.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE is a sectional view of an embodiment of the electric double layer capacitor according to the invention.

DETAILED DESCRIPTION OF THE INVENTION

The vinylidene fluoride polymer constituting the electrode-forming composition according to the present invention and functioning as a binder in the resultant activated carbon electrode layer may suitably comprise a vinylidene fluoride homopolymer or a vinylidene fluoride copolymer comprising at least 50 wt. % of vinylidene fluoride and at most 50 wt. % of a monomer copolymerizable therewith.

Examples of the monomer copolymerizable with vinylidene fluoride monomer may include: hydrocarbon monomers, such as ethylene and propylene; fluorine-containing monomers, such as vinyl fluoride, trifluoroethylene, trifluorochloroethylene, tetrafluoroethylene, hexafluoropropylene and fluoroalkyl vinyl ether; carboxyl group-containing monomers, such as monomethyl maleate, and monomethyl citraconate; and epoxy group-containing monomers, such as allyl glycidyl ether and crotonic acid glycidyl ether. These are however not exhaustive. Among these, it is preferred to use a vinylidene fluoride copolymer with hexafluoropropylene or trifluorochloroethylene.

The vinylidene fluoride polymer as the binder may preferably have an inherent viscosity of 0.5–20.0 dl/g, more preferably 0.5 dl/g–5.0 dl/g in view of the adhesion with the electroconductive substrate and the mechanical strength of the resultant activated carbon electrode layer. The inherent viscosity is used herein as a measure of polymer molecular weight and refers to a logarithmic viscosity at 30° C. of a solution of 4 g of a sample resin dissolved in 1 liter of N,N-methylformamide.

The solvent constituting the electrode-forming composition of the present invention together with the vinylidene fluoride polymer is a mixture of a good solvent and a plasticizer, respectively for a vinylidene fluoride polymer, preferably the vinylidene fluoride polymer used. It is not necessary for the good solvent and the plasticizer to be mixed prior to formation of the electrode-forming composition, but it is only required for these components to be present in mixture within the electrode-forming composition prior to the use thereof for preparation of the electrode.

The "good solvent for a vinylidene fluoride polymer" refers herein to an organic solvent capable of forming a solution of the vinylidene fluoride polymer having a concentration of at least 1 wt. %, preferably at least 5 wt. %, at room temperature (25° C.). Suitable examples thereof may include: N-methyl-2-pyrrolidone, dimethylformamide, N,N-dimethylacetamide, N,N-dimethyl sulfoxide, hexamethylphosphoramide, acetone, 1,4-dioxane, tetrahydrofuran, methyl acetate, tetramethylurea, and triethyl phosphate. These good solvents may be used singly or in mixture of two or more species.

The plasticizer for a vinylidene fluoride polymer refers herein to a compound which per se has a poor (or substantially negligible) dissolving power for the vinylidene fluoride polymer but has a function of plasticizing the vinylidene fluoride polymer. The plasticizer may preferably have a weight-average molecular weight of at least 500, preferably 500–10000, more preferably 800–3000. (Herein, molecular weight refers to a polystyrene-equivalent molecular weight as measured by GPC (gel permeation chromatography)). If the weight-average molecular weight is below 500, the plasticizer is liable to excessively bleed out of the vinylidene fluoride polymer as the binder, so that the composite layer formed by application of the electrode-forming composition is liable to be peeled during subsequent drying. In case where the plasticizer has a weight-average molecular weight in excess of 10,000, the electrode-forming composition is liable to have a high viscosity so that its processability can be remarkably lowered. Preferred examples of the plasticizer may include aliphatic polyesters formed from aliphatic dibasic acids and glycols, inclusive of: adipic acid-based polyesters, such as adipic acid-propylene glycol and adipic acid-1,3-butylene glycol; sebacic acid-based polyesters, such as sebacic acid-propylene glycol, and sebacic acid-3-butylene glycol; and azelaic acid-based polyesters, such as azelaic acid-propylene glycol and azelaic acid-1,3-butylene glycol. Among these, adipic acid-based polyesters are particularly preferred in view of a moderate degree of compatibility with a vinylidene fluoride polymer. The amount of the plasticizer may appropriately be selected and ordinarily be selected so as not to excessively lower the dissolving power of the entire solvent (i.e., the mixture with the good solvent). More specifically, the plasticizer may preferably be used in 3–50 wt. %, more preferably 10–40 wt. %, of the mixture solvent. Below 3 wt. %, the plasticizer effect is liable to be insufficient, thus possibly causing the peeling of the electrode. Above 50 wt. %, the mixture solvent is liable to have a lower dissolving power for the vinylidene fluoride polymer, possibly causing the gelling of the electrode-forming composition before the application thereof onto the electroconductive substrate.

The mixture solvent (as a combination of the plasticizer and the good solvent) may preferably be used in an amount providing a solution or slurry having a solid matter concentration of 0.5–50 wt. %, more preferably ca. 15–35 wt. %. Herein, the solid matter refers to a total of the vinylidene fluoride polymer, activated carbon and another optionally added slid matter in the electrode-forming composition.

The activated carbon constituting the electrode-forming composition of the present invention together with the vinylidene fluoride polymer and the solvent may suitably have a specific surface area (as measured by the nitrogen adsorption BET method) of 500–3000 $m^2/g$, preferably 800–2500 $m^2/g$. Specific examples thereof may include: coconut shell-based activated carbon, petroleum coke-based activated carbon, pitch-based activated carbon, polyvinylidene chloride-based activated carbon, polyacene-based activated carbon, phenolic resin-based activated carbon, and polyacrylonitrile-based activated carbon.

The electrode-forming composition of the present invention is composed of at least the above-mentioned vinylidene fluoride polymer, the solvent and the activated carbon. It is an ordinary practice to further add an electroconductivity-imparting material, examples of which may include: carbon black, natural graphite, artificial graphite, metal oxides such as titanium oxide and ruthenium oxide, and metal fiber. Among these, it is particularly preferred to use carbon black inclusive of ketcjen black, acetylene black and furnace black as further preferred species thereof. The electroconductivity-imparting material may be added in an amount selected depending on a required degree of conductivity and preferably in an amount providing a total of the activated carbon and the electroconductivity-imparting material of 5–99 wt. parts, more preferably 9–50 wt. parts, per 1 wt. part of the vinylidene fluoride polymer.

The electrode-forming composition of the present invention may be prepared in a slurry form by mixing the above-described components in an arbitrary order, optionally under heating. The thus-prepared slurry composition may have a good applicability onto an electroconductive substrate.

The electrode-forming composition of the present invention prepared in the above-described manner may be applied onto an electroconductive substrate, and the solvent may be selectively removed, e.g., by evaporation, from the applied composition layer, to provide an activated carbon electrode structure having an activated carbon electrode layer (polarizable electrode layer) of the present invention. The electroconductive substrate may for example comprise foils of metals, such as aluminum, stainless steel, titanium and tantalum.

The application or coating method may appropriately be selected from known ones. A doctor blade coating method is particularly preferred. The electroconductive substrate coated with the electrode-forming composition after the selective removal of the solvent may be subjected to a pressing step, as desired, to provide a polarizable electrode structure for an electric double layer capacitor.

For providing a further improved performance of the resultant electric double layer capacitor, it is preferred that the electrode-forming composition layer of the activated carbon electrode structure, optionally after partial removal of the solvent by evaporation, is subjected to extraction with a poor solvent for a vinylidene fluoride polymer. This is because the plasticizer, when left in the polarizable electrode layer, can adversely affect the performance of the resultant electric double layer capacitor while it depends on the particular species of the plasticizer used. The extraction treatment also has an effect of reducing the amount of the whole solvent inclusive of the good solvent (and a possibly contained poor solvent) in the activated carbon electrode layer of the polarizable electrode structure. The organic solvent used for the extraction is a poor solvent for a vinylidene fluoride polymer, giving a solubility of the vinylidene fluoride polymer therein of preferably at most 0.5 wt. %, more preferably at most 0.1 wt. %. It is further preferred that the poor solvent is mutually soluble with the plasticizer. In order to facilitate the removal by evaporation, the poor solvent may preferably have a boiling point of at most 100° C. Examples thereof may include: alcohols, such as methyl alcohol and isopropyl alcohol; and chlorinated hydrocarbons, such as methylene chloride, and 1,1,1-trichloroethane. Among these, methylene chloride is particularly preferred because of inflammability and easy drying characteristic. On the other hand, if a good solvent for a vinylidene fluoride polymer is used as the extraction solvent, the vinylidene fluoride polymer as the binder in the activated carbon electrode layer can flow out of the electrode layer during the extraction to lose the binder function.

The effect of the extraction of the plasticizer may be attained by simply dipping and leaving still the electrode structure after drying within an organic solvent as a poor solvent for a vinylidene fluoride polymer at 5–100° C., preferably 10–50° C., within an extractor vessel, but it is also possible to enhance the extraction effect, as desired, by moving the electrode structure within the extraction solvent or applying a vibration as by application of ultrasonic wave. The electrode structure after the extraction is subjected to a heat treatment at 40–170° C. to provide an activated carbon electrode structure for use.

The electric double layer capacitor according to the present invention may for example have a sectional structure as shown in the sole FIGURE. The sole FIGURE that is a sectional view of a single cell-type electric double layer capacitor as an embodiment of the electric double layer capacitor according to the present invention. Referring to the sole FIGURE, the electric double layer capacitor includes a pair of polarizable electrodes 1 each comprising an activated carbon electrode layer 1a and an electroconductive substrate 1b and a separator 2 sandwiched between the polarizable electrode 1. The sandwiched structure is sealed up between a stainless steel-made cap 3 and a stainless steel-made can 4 containing therein an electrolytic solution 5. As a result, the separator 2 is impregnated with the electrolytic solution 5 so that the electrolytic solution 5 is disposed between the pair of polarizable electrodes 1. The separator 2 may comprise an appropriate porous or fibrous material, examples of which may include: glass fiber-made nonwoven cloth, paper, and porous membranes of synthetic resins. The electrolytic solution 5 may comprise propylene carbonate as a popular solvent, and a quaternary phosphonium salt or a quaternary ammonium salt as a popular electrolyte. For example, it is possible to use an organic electrolytic solution comprising a solution of $(C_2H_5)_4NBF_4$ in propylene carbonate. The electrolyte concentration in the electrolytic solution may appropriately be selected within a range of 5–95 wt. %, or 0.1–4.0 mol/l, preferably 0.5–2.0 mol/l.

Hereinbelow, the present invention will be described more specifically based on Examples and Comparative Example.

EXAMPLE 1

90 wt. parts of pitch-based activated carbon powder (BET specific surface area $(S_{BET})$=1200 m$^2$/g) and 2 wt. parts of carbon black ("DENKA BLACK", mfd. by Denki Kagaku Kogyo K.K.) were blended with 80 wt. parts of a 10 wt. %-solution of polyvinylidene fluoride having an inherent viscosity ($2_{inh}$) of 1.7 dl/g ("KF#1700", mfd. by Kureha Kagaku Kogyo K.K.) in N-methyl-2-pyrrolidone, and further 114 wt. parts of N-methyl-2-pyrrolidone and 47 wt. parts of an adipic acid-based polyester plasticizer having a weight-average molecular weight (Mw) of 2320 ("ADEKACIZER PN150", mfd. by Asahi Denka Kogyo K.K.) were added thereto, followed by mixing at 30° C., to prepare a slurry-form electrode-forming composition.

The electrode-forming composition was applied in a width of 110 mm by means of a doctor blade onto one surface of a ca. 20 μm-thick aluminum foil having a width of 200 mm and dried under heating at 130° C. for 30 min. to obtain a sheet-form electrode structure (electrode sheet) having a 250 μm-thick composite electrode layer. No noticeable curl was observed on the electrode sheet. The electrode sheet was dipped in methylene chloride at 25° C. for 30 min. as an extraction treatment and thereafter dried under heating at 130° C. for 10 min. A portion of the electrode sheet after the extraction and drying was cut out to provide a test piece for a flexibility test, and 10 disk-shaped sheets each in a diameter of 15 mm were stamped out from the remainder of the electrode sheet. The 10 disk sheets were pressed under a pressure of 102 MPa for 1 min. to obtain 10 polarizable electrode (activated carbon electrode) sheets. During the stamping and pressing, no peeling of the electrode layer was recognized at all. As shown in the sole FIGURE, two of the electrode sheets were taken as polarizable electrodes 1, and a sample 2 of glass fiber-made nonwoven cloth was sandwiched between the coating electrodes 1*a* of the two electrode sheets 1. The sandwiched structure was further stored within a container composed of a stainless steel-made cap 3 and a stainless steel-made can 4. Then, an electrolytic solution 5 formed as a 1 mol/liter-solution of $(C_2H_5)_4NBF_4$ in propylene carbonate was poured into the container to sufficiently impregnate the activated carbon electrode layers 1*a* and the separator 2, followed by crimping of the edges of the cap 3 and the can 4 together with a polypropylene-made packing 6 to form an integral structure as shown in the sole FIGURE.

The thus-prepared electric double layer capacitor was charged at a current density of 1.6 mA/cm$^2$ up to 2.5 volts, then held in the charged state for 3 hours and then discharged at the same current density of 1.6 mA/cm$^2$ down to 0 volt, to measure a discharged energy capacity (initial energy capacity) of 18.5 mWh per g-activated carbon in the two activated carbon electrodes. The electrodes after the charge-discharge test were observed with eyes, whereby no change in shape was recognized.

Further, a curling-test sample sheet was cut out in a length of 200 mm from the electrode sheet having a 110 mm-side composite electrode layer after the coating and drying and before the extraction on the 200 mm-wide aluminum foil. The sample sheet was placed on a flat aluminum sheet so that its composite electrode layer was directed toward the aluminum sheet, and a maximum distance from the aluminum sheet surface to the highest portion of the composite electrode layer surface was measured. The measured value was 2 mm and almost no curl was recognized.

Further, a flexibility test sample sheet was cut out in a length of 300 mm (aluminum fail width=200 mm, composite electrode layer width=110 mm) from the electrode sheet after the extraction. The sample sheet was placed to wrap over a 30 mm-dia. metal roller so that its aluminum foil contacted the roller, and the sample sheet was slidably moved over and relative to the metal roller in a direction transverse to the roller extension for 4 reciprocations at a stroke of 20 mm with respect to the composite electrode layer portion. As a result, the composite electrode layer exhibited no peeling at all, thus showing a good flexibility of the electrode layer.

The results are inclusively shown in Table 1 hereinbelow together with those of the following Example 2 and Comparative Example 1.

EXAMPLE 2

90 wt. parts of pitch-based activated carbon powder (BET specific surface area $(S_{BET})$=1200 m$^2$/g) and 2 wt. parts of carbon black ("DENKA BLACK", mfd. by Denki Kagaku Kogyo K.K.), both identical to those used in Example 1, were blended with 160 wt. parts of a 5 wt. %-solution of polyvinylidene fluoride ($2_{inh}$=8.8 dl/g) (mfd. by Kureha Kagaku Kogyo K.K.) in N-methyl-2-pyrrolidone, and further 34 wt. parts of N-methyl-2-pyrrolidone and 47 wt. parts of an adipic acid-based polyester plasticizer (Mw=2320, "ADEKACIZER PN150", mfd. by Asahi Denka Kogyo K.K.) were thereto, followed by mixing at 30° C., to prepare a slurry-form electrode-forming composition.

The electrode-forming composition was applied by mean of a doctor blade in the same manner as in Example 1 onto an aluminum foil identical to the one used in Example 1 and dried under heating at 130° C. for 30 min. to form an electrode sheet having a 250 μm-thick and 110 mm-wide composite electrode layer. No noticeable curl was observed on the electrode sheet. The electrode sheet was dipped in methylene chloride at 25° C. for 30 min. as an extraction treatment and thereafter dried under heating at 130° C. for 10 min. A portion of the electrode sheet after the extraction and drying was cut out to provide a test piece for a flexibility test, and 10 disk-shaped sheets each in a diameter of 15 mm were stamped out from the remainder of the electrode sheet. The 10 disk sheets were pressed under a pressure of 102 MPa for 1 min. to obtain 10 polarizable electrode (activated carbon electrode) sheets. During the stamping and pressing, no peeling of the electrode layer was recognized at all. An electric double layer capacitor was prepared by using two of the 10 disk electrode sheets otherwise in the same manner as in Example 1, and subjected to measurement of an initial energy capacity in the same manner as in Example 1 whereby an initial energy capacity of 18.3 mWh/g was exhibited.

As a result of the same curling test as in Example 1, the composite electrode layer surface showed a maximum height above the flat aluminum plate of 1 mm, and almost no curl was recognized. Further, as a result of the same flexibility test as in Example 1, the composite electrode layer exhibited no peeling at all, thus showing a good flexibility of the electrode layer.

Comparative Example 1

90 wt. parts of pitch-based activated carbon powder (BET specific surface area $(S_{BET})$=1200 m$^2$/g) and 2 wt. parts of carbon black ("DENKA BLACK", mfd. by Denki Kagaku Kogyo K.K.), both identical to those used in Example 1, were blended with 80 wt. parts of a 10 wt. %-solution of polyvinylidene fluoride ($2_{inh}$=1.7 dl/g) ("KF#1700", mfd. by Kureha Kagaku Kogyo K.K.) in N-methyl-2-pyrrolidone, and further 161 wt. parts of N-methyl-2-pyrrolidone was added thereto, followed by mixing at 30° C., to prepare a slurry-form electrode-forming composition.

The electrode-forming composition was applied by mean of a doctor blade in the same manner as in Example 1 onto an aluminum foil identical to the one used in Example 1 and dried under heating at 130° C. for 30 min. to form an electrode sheet having a 250 μm-thick and 110 mm-wide composite electrode layer. The electrode sheet was remarkably curled toward the composite electrode side. The electrode sheet was dipped in methylene chloride at 25° C. for 30 min. as an extraction treatment and thereafter dried under heating at 130° C. for 10 min. similarly as in Example 1. The electrode sheet after the extraction and drying showed a partial peeling at edges of the composite electrode layer. The electrode sheet was further subjected to preparation of a flexibility test sample by cutting-out, and preparation of 10 disk-shaped polarizable electrode sheets by a stamping and pressing similarly as in Example 1. During the stamping and pressing, 8 sheets of the 10 electrode sheets caused peeling at edges. An electric double layer capacitor was prepared by using two disk electrode sheets free from the edge peeling otherwise in the same manner as in Example 1, and subjected to measurement of an initial energy capacity in the same manner as in Example 1 whereby an initial energy capacity of 18.0 mWh/g was exhibited.

As a result of the same curling test as in Example 1, the composite electrode layer surface showed a maximum height above the flat aluminum plate of 25 mm, thus showing a remarkable degree of curl. Further, as a result of the same flexibility test as in Example 1, the composite electrode layer caused cracks and peeling over a ca. 50% of the whole area thereof because of a poor flexibility.

The results are inclusively shown in Table 1 below together with those of Example 1.

TABLE 1

|  | Example 1 | Example 2 | Comparative Example 1 |
|---|---|---|---|
| [Electrode sheet] | | | |
| (1) Curling height | 2 mm | 1 mm | 25 mm |
| (2) Electrode layer edge peeling after extraction | none | none | present |
| (3) Number of sheets having caused edge peeling after stamping and pressing (sheets/10 sheets) | 0 | 0 | 8 |
| (4) Peeling area (%) after flexibility test | 0% | 0% | 50% |
| [Capacitor] | | | |
| (1) Initial energy capacity (mWh/g) | 18.7 | 18.3 | 18.0 |

As described above, according to the present invention, there is provided an electrode-forming composition for producing an activated carbon electrode formed by blending activated carbon, a vinylidene fluoride polymer and a solvent including a plasticizer in addition to a good solvent for the vinylidene fluoride polymer. If the electrode-forming composition is applied onto an electroconductive substrate, and the solvent is selectively removed preferably by a combination of extraction of the plasticizer with a poor solvent for the vinylidene fluoride polymer and evaporation of the solvent, it is possible to obtain an activated carbon electrode (polarizable electrode) that has an activated carbon electrode layer exhibiting good adhesion onto the electrode-conductive substrate and good flexibility, and therefore has good processability. By using the activated carbon electrodes as polarizable electrodes, it becomes possible to provide an electric double layer capacitor having improved reliability.

What is claimed is:

1. A composition useful for forming an electrode, comprising activated carbon, a vinylidene fluoride polymer having an inherent viscosity of 0.5–20.0 dl/g, an organic solvent capable of forming a solution of the vinylidene fluoride polymer having a concentration of at least 1 wt. % at 25° C., and a plasticizer for the vinylidene fluoride polymer.

2. A composition according to claim 1, wherein the plasticizer has a weight-average molecular weight of at least 500.

3. A composition according to claim 1, wherein the plasticizer comprises an aliphatic polyester.

4. An activated carbon electrode structure, comprising an electroconductive substrate, and an activated carbon electrode layer disposed on the electroconductive substrate, wherein the activated carbon electrode has been formed through sequential steps of applying the composition according to any one of claims 1–3 to form a composite layer, and selectively removing the organic solvent and the plasticizer from the composite layer.

5. An activated carbon electrode structure according to claim 4, wherein the selective removal of the plasticizer from the composite layer is effected by contacting the composite layer with a second organic solvent giving a solubility of the vinylidene fluoride polymer therein of at most 0.5 wt. %, to extract the plasticizer from the composite layer, and removing the second organic solvent from the composite layer by evaporation.

6. An activated carbon electrode structure according to claim 5, wherein at least a portion of the organic solvent is removed by evaporation from the composite layer prior to contacting the second solvent.

7. An electric double layer capacitor, comprising a pair of polarizable electrodes, and an electrolytic solution disposed between the polarizable electrodes, wherein at least one of the polarizable electrodes comprises an activated carbon electrode structure according to claim 4.

8. An electric double layer capacitor, comprising a pair of polarizable electrodes, and an electrolytic solution disposed between the polarizable electrodes, wherein at least one of the polarizable electrodes comprises an activated carbon electrode structure according to claim 5.

9. An electric double layer capacitor, comprising a pair of polarizable electrodes, and an electrolytic solution disposed between the polarizable electrodes, wherein at least one of the polarizable electrodes comprises an activated carbon electrode structure according to claim 6.

* * * * *